United States Patent [19]

Mayhew et al.

[11] 4,147,317
[45] Apr. 3, 1979

[54] MOBILE RPV LANDING DECK

[75] Inventors: Harry E. Mayhew, Wilmington; Harry W. De Shay, Rambleton Acres, both of Del.

[73] Assignee: All American Industries, Inc., Thomaston, Conn.

[21] Appl. No.: 809,478

[22] Filed: Jun. 23, 1977

[51] Int. Cl.² .............................................. B64F 1/02
[52] U.S. Cl. ................................ 244/116; 244/110 C
[58] Field of Search .................... 244/110, 114–116, 244/63; 114/261, 262

[56] References Cited

U.S. PATENT DOCUMENTS

| | | | |
|---|---|---|---|
| 1,085,000 | 1/1914 | Amiss | 244/110 E |
| 1,637,769 | 8/1927 | Ennisson | 244/114 R |
| 2,380,105 | 7/1945 | Gerrard | 244/110 E |
| 2,814,453 | 11/1957 | Trimble Jr. et al. | 244/63 |
| 3,147,940 | 9/1964 | Laufer | 244/114 R |
| 3,367,608 | 2/1968 | Charno et al. | 244/110 C |

FOREIGN PATENT DOCUMENTS 1114568  4/1956  France ................. 244/114 R

*Primary Examiner*—Galen L. Barefoot
*Attorney, Agent, or Firm*—Connolly and Hutz

[57] ABSTRACT

A deck for landing an arrested RPV has a row of substantially parallel elastic stringers deployed between a pair of open bed trailers. The stringers are attached to longitudinal rails on the trailers and to wind-up winches for tensioning the stringers. A pendant or net is attached across one of the trailers between a pair of stanchions and is connected to energy absorbers on the other trailer for arresting the landing RPV and dropping it down on the deck. Protruding elements of the RPV slide down inbetween the stringers to protect them from damage as the larger body and wing portions are caught on the stringers.

14 Claims, 2 Drawing Figures

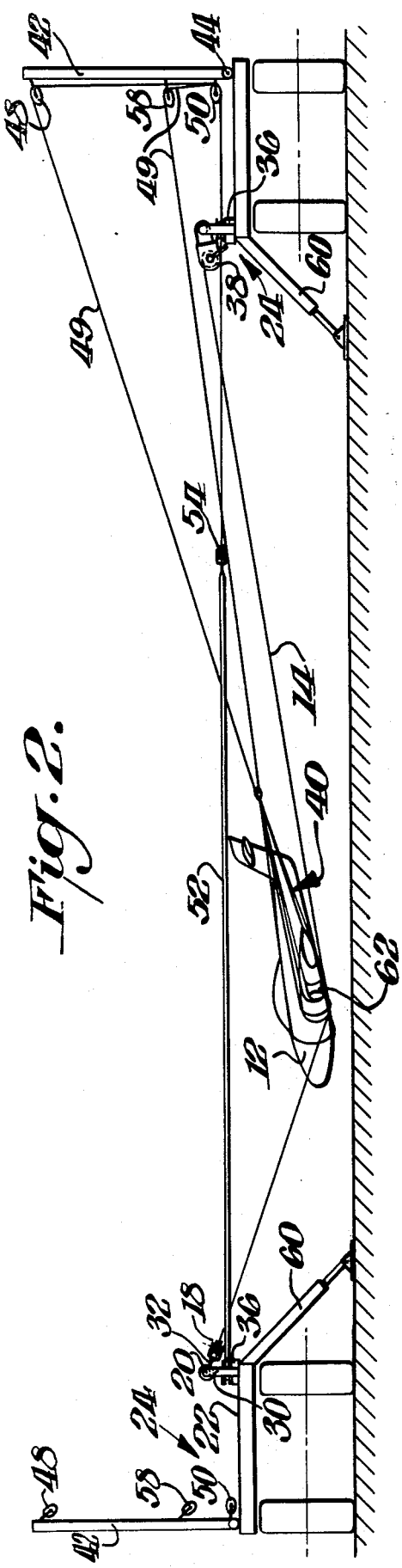

MOBILE RPV LANDING DECK

BACKGROUND OF THE INVENTION

Remotely piloted vehicle aircraft (RPV's) usually do not have landing gear and their landing shock must, therefore, be cushioned to prevent damage. Various resilient landing platforms and nets have been proposed for catching them. Some landing platform or deck installations, such as described in U.S. Pat. No. 2,814,453, are capable of disassembly into a number of small sections for transporting them on suitable trucks or trailers. Assembly and disassembly, however, requires considerable time and trouble. An object of this invention is to provide a simple and economical deck for catching RPV's, which is highly mobile and simple to construct, disassemble and move.

SUMMARY

In accordance with this invention a pair of mobile trailers support a parallel array of elastic stringers which are tensioned between them. The stringers are detachably connected to anchor means disposed along the length of each of the trailers for ready deployment, tensioning and detachment for moving with the trailers to another location. The stringers are conveniently fabricated from loops of strong synthetic fiber tape, each of which includes a tensioning winch. The stringers are tensioned after they are detachably anchored between rails extending along the length of each of the trailers. A pendant or net for arresting the landing RPV and dropping it down on the deck is stretched between a pair of stanchions mounted on at least one of the trailers. The pendant and/or net is attached to an energy absorber on the other trailer for arresting the landing RPV and dropping it down on the deck.

BRIEF DESCRIPTION OF THE DRAWINGS

Novel features and advantages will become apparent to one skilled in the art from a reading of the following description in conjunction with the accompanying drawings wherein similar reference characters refer to similar parts and in which:

FIG. 2 is a side view in elevation of the installation shown in FIG. 1 after it has caught a landing RPV.

DESCRIPTION OF THE PREFERRED EMBODIMENT

Figure 1:
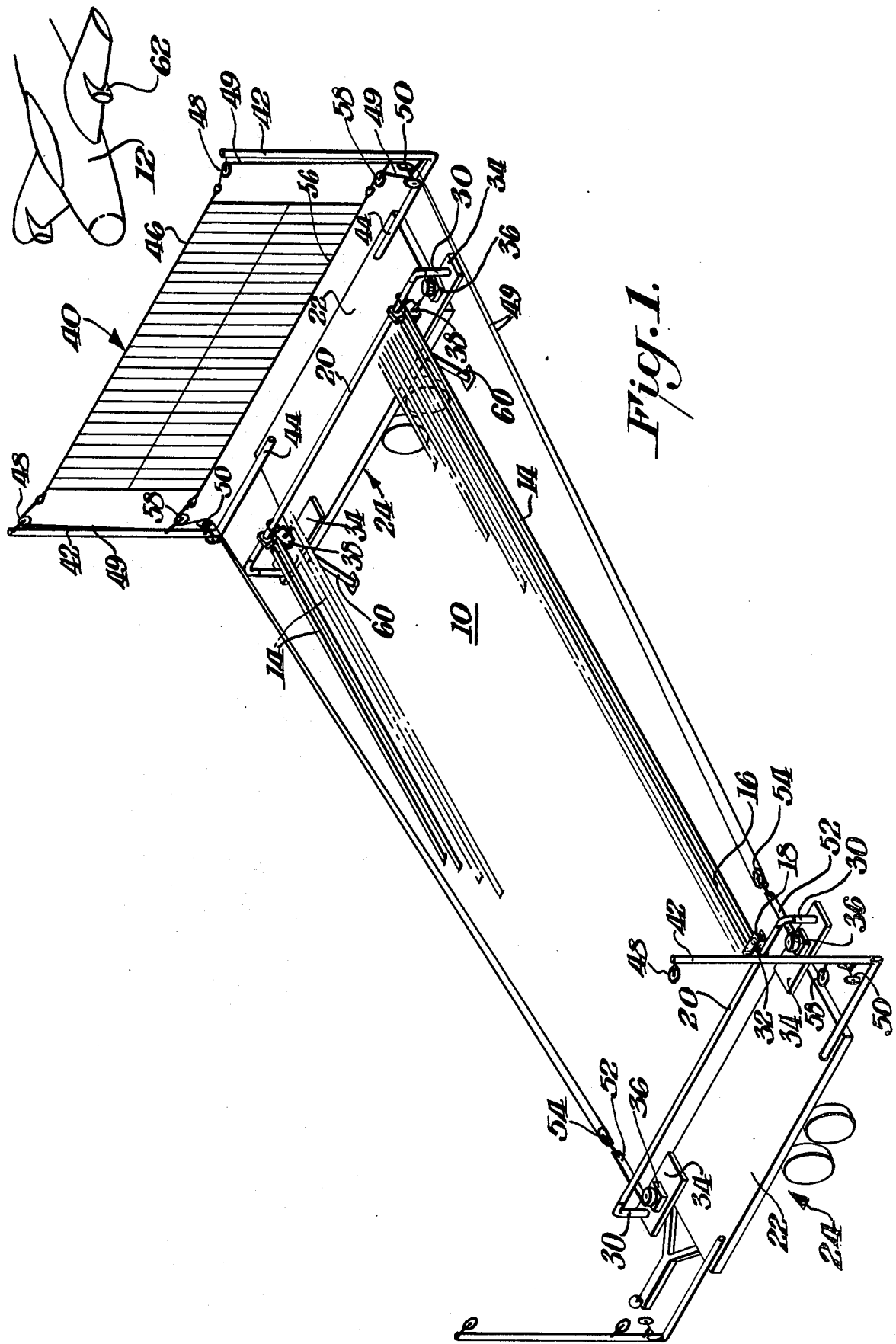
FIG. 1 is a three-dimensional view of an RPV-landing deck, which is one embodiment of this invention in condition for arresting and catching a landing RPV.

In FIG. 1 is shown a deck 10 for catching a landing RPV 12 on a parallel array of stringers 14. Stringers 14 are each, for example, arranged in a loop 16 adjustably attached at one end to a double pulley anchor block 18. Suitable material for stringers 14 is somewhat elastic nylon tape 1¾ inches wide by 3/32 inch thick of a firm weave. Stringer 14 may also be made of polyester or polypropylene fibers. Block 18 is coupled to rail 20 supported a short distance above beds 22 of trailers 24 on a pair of vertical rods 30 mounted on trailer corner plates 34, upon which are also mounted energy absorbers 36. Energy absorbers 36 are, for example, small versions of the energy absorbers described in U.S. Pat. No. 3,172,625. Double pulley anchor blocks 18 are attached to rail 20 by detachable hooks 32.

The other ends of loops 16 are each individually attached to rail 20 disposed above trailer 24 on vertical rods 30 attached to trailer 24 in a similar manner to which rods 30 are attached to trailer 24. A tensioning winch 38 is connected to every other longitudinal stringer 14 for tensioning them a predetermined uniform amount such as ten foot pounds. Tensioning winches 38 are, for example, of the type commonly used on small boat trailers.

An RPV arresting means 40 is connected between a pair of stanchions 42 mounted outboard of the ends of trailer 24 by horizontal support bars 44 secured to the top of trailer 24.

Arresting net 40 is accordingly shown in FIG. 1 deployed between stanchions 42. Net 40 has upper cables 46 attached over pulleys 48 secured to stanchion 42. Cable 49 is for example, a ¼ inch nylon rope which extends downwardly from upper cable 46 inside of stanchion 42 and around pulley 50 towards equalizing pulley 54 about which cable 49 returns to lower net cable 56 around pulley 58. Equalizing pulley 54 is connected to nylon tape 52 of energy absorber 36, upon which tape 52 is reeled and retarded. Tape 52 is, for example, nylon tape 1¾ inches wide by ⅛ inch thick of a longitudinal filament type described in U.S. Pat. No. 2,977,076.

Stanchions 42 at the left hand end of deck 10 do not have an arresting pendant or net connected between them and a landing RPV can, therefore, only be arrested in a flight path from right to left relative to deck 10. Another net 40 may be connected to left-hand stanchions 42 for bidirectional arrestment.

Trailers 24 have load-supporting legs or struts 60 extending diagonally inwardly from bed 22 to help support bed 22 from being overturned by the inwardly directed force created by a aircraft dropping down on deck 10.

FIG. 2 shows a landed RPV 12 supported on stringer 14 of deck 10. Stringers 14 are, for example, about 64 feet long. The weight of RPV 12 is supported by stringer 14 disposed about its larger fuselage and wing portions with protruding elements such as motor 62, slid through and between stringers 14. This avoids damaging the more sensitive protruding elements of RPV 12.

We claim:

1. A mobile RPV landing deck comprising a pair of over-the-road trailers for disposition with their longitudinal axes parallel to each other with a distance between them substantially equal to the length of the deck, a plurality of somewhat elastic longitudinal stringers disposed substantially perpendicular to the longitudinal axes of the trailers, longitudinal anchor means on each of the trailers for supporting the elastic stringers deployed between the trailers in a spaced parallel disposition, detachable connecting means on the ends of the stringers for attaching them to the trailers whereby the stringers are deployed parallel and a short distance from each other to form an elastic deck between the trailers for receiving an arrested RPV dropped down upon the deck, the detachable connecting means being constructed and arranged for rapid and convenient detachment of the stringers to at least one of the trailers whereby the stringers may be rapidly disconnected from at least one of the trailers and stored upon at least one of the trailers whereby the deck may be rapidly and conveniently moved together with the trailers from one location to another, an aircraft-arresting means is connected to at least one of the trailers, an energy absorber is mounted on at least one of the trailers including a linear payout element, and linear means connects the aircraft-arresting means to the linear payout element.

2. A mobile landing deck as set forth in claim 1, wherein an arresting means is disposed at least on one of the trailers for catching the landing RPV and dropping it down upon the deck.

3. A mobile landing deck as set forth in claim 2, wherein the arresting means comprises an aircraft-arresting pendant.

4. A mobile landing deck as set forth in claim 2, wherein the arresting means comprises an aircraft-arresting net.

5. A mobile landing deck as set forth in claim 1, wherein the somewhat elastic stringers are disposed in loops, and each of the loops have a tensioning means inserted in them whereby the tension on the stringers can be varied.

6. A mobile landing deck as set forth in claim 1, wherein supporting legs are mounted on at least one of the trailers for supporting it against the pull of the elastic stringers.

7. A mobile landing deck as set forth in claim 6, wherein the supporting legs are mounted on both of the trailers.

8. A mobile landing deck as set forth in claim 2, wherein an aircraft-arresting means is mounted on both of the trailers.

9. A mobile landing deck as set forth in claim 1, wherein the stringers comprise nylon type.

10. A mobile landing deck as set forth in claim 1, wherein the longitudinal anchor means comprises longitudinal rails on the trailers.

11. A mobile landing deck as set forth in claim 10, wherein the stringers have tensioning means inserted in them whereby the tension on the stringers can be varied.

12. A mobile landing deck as set forth in claim 11 wherein the tensioning means comprises small winches.

13. A mobile landing deck as set forth in claim 12, wherein the stringers are disposed in loops, each of the loops have a small winch inserted in them, and the loops are attached to at least one of the rails by detachable hooks.

14. A mobile RPV landing deck comprising a pair of over-the-road trailers for disposition parallel to each other with a distance between them substantially equal to the length of the deck, a plurality of somewhat elastic longitudinal stringers, longitudinal anchor means on each of the trailers for supporting the elastic stringers deployed between the trailers in a spaced parallel disposition, detachable connecting means on the ends of the stringers for attaching them to the trailers whereby the stringers are deployed parallel and a short distace from each other to form an elastic deck between the trailers for receiving an arrested RPV dropped down upon the deck, the detachable connecting means being constructed and arranged for rapid and convenient detachment of the stringers to at least one of the trailers whereby the stringers may be rapidly disconnected from at least one of the trailers and stored upon at least one of the trailers whereby the deck may be rapidly and conveniently moved together with the trailers from one location to another, an aircraft-arresting means is connected to at least one of the trailers, an energy absorber is mounted on at least one of the trailers including a linear payout element, linear means connects the aircraft-arresting means to the linear payout element, and the aircraft-arresting means being mounted on one of the trailers, and the energy absorber is mounted on the other of the trailers.

* * * * *